United States Patent Office 3,816,500
Patented June 11, 1974

3,816,500
2-CHLOROBENZYL N,N-DIETHYLTHIO-CARBAMATE
Ichiro Kimura and Yoshiro Takahashi, Shizuoka, and Hideo Ito, Shimizu, Japan, assignors to Kumiai Chemical Industry Co., Ltd., Chiyoda-ku, Tokyo, Japan
No Drawing. Continuation-in-part of application Ser. No. 162,259, July 13, 1971, now Patent No. 3,746,532. This application Nov. 3, 1971, Ser. No. 195,490
Int. Cl. C07c 155/08
U.S. Cl. 260—455 A       1 Claim

ABSTRACT OF THE DISCLOSURE 2-chlorobenzyl N,N - diethylthiocarbamate has been found to possess excellent herbicidal properties and high toxicity toward sea-organisms.

RELATED APPLICATION

This is a continuation-in-part of copending U.S. patent application Ser. No. 162,259, filed July 13, 1971, now U.S. Pat. 3,746,532, which claimed priority under 35 U.S.C. 119 based on a corresponding Japanese patent application filed in that country on July 16, 1970.

BACKGROUND OF THE INVENTION

Field of the Invention

This invention relates to a novel monochlorobenzyl ester thiocarbamate and the preparation thereof.

Description of the Prior Art

U.S. Pat. 2,992,091, disclosed that trichlorobenzyl diethylthiocarbamate is characterized by herbicidal activity, especially to broad-leaf weeds when applied to their stems or leaves. In applicants' copending application Ser. No. 162,259, filed July 13, 1971, applicants reported that monochloro compounds including 2-chlorobenzyl N,N-diethylthiocarbamate, are severely toxic to various plants, but are substantially nontoxic to cotton or corn. This was quite a significant discovery, especially for the control of weeds in the summer planting of up-land fields, which enabled the elimination of a significant amount of labor which was previously required for weed removal.

It has now been discovered that 2-chlorobenzyl N,N-diethylthiocarbamate additionally possesses a high degree of toxic activity toward various sea organisms. Sea water is increasingly used as an industrial cooling source for thermal power stations, petrochemical factories or the like. The presence of sea organisms in the water, however, can cause various difficulties when using sea water as a cooling source. For one, various types of sea organisms can decrease the cooling coefficient particularly when the water lines become fouled by the adherence of Blue mussel, Balanus, oysters, Hydrozoa or the like. Previously, chlorine or formaline have been used to control this difficulty. However, both are quite toxic to humans and animals and are corrosive to the operating equipment.

It would be desirable, therefore, to provide a composition which will effectively control such sea organisms, yet which is not highly toxic to higher animals and humans and which is not corrosive.

SUMMARY OF THE INVENTION

Accordingly, it is one object of this invention to provide a compound which has a high degree of herbicidal activity and good weed selectivity.

It is another object of this invention to provide a compound which has a high degree of toxic activity toward various sea organisms, such as Blue mussel, Balanus, oysters, Hydrozoa, plankton and a large number of other sea organisms.

These and other objects have now herein been attained by the use of 2-chlorobenzyl N,N-diethylthiocarbamate. This compound may be prepared by the reaction of diethylamine with carbonyl sulfide in the presence of a base which is further reacted with 2-chlorobenzyl halide.

DESCRIPTION OF THE EMBODIMENTS

In this reaction, an organic solvent solution of carbonyl sulfide is added dropwise to an aqueous solution containing diethylamine and a base such as alkali metal hydroxide.

Alternatively, it is also possible to add an aqueous solution containing diethylamine and an alkali dropwise to an organic solvent solution of carbonyl sulfide. Suitable solvents which may be used for this reaction are the aromatic solvents, such as benzene, toluene and xylene, etc.

The following is one example of the process for producing the novel compound of this invention.

EXAMPLE 1

Synthetic method of s-2-chlorobenzyl N,N-diethylthiocarbamate

A 2,000 ml. four-necked flask was equipped with a stirrer, condenser, thermometer and gas inlet tube; a mixture of 131 parts of diethylamine and 500 parts of a 12% aqueous solution of sodium hydroxide was charged into the flask, 120 parts of carbonyl sulfide was introduced to the mixture, at 0 to 5° C. over 6 hours while vigorously stirring.

After the introduction of carbonyl sulfide, the reaction mixture was stirred at 0 to 5° C. for 2 hours.

1,000 parts of acetone were added to the reaction mixture and 308 parts of 2-chlorobenzyl bromide were added dropwise into the reaction mixture at 0 to 5° C. for 1.5 hours.

After the addition of 2-chlorobenzyl bromide, the reaction mixture was stirred at 40° C. for 3 hours and the acetone was evaporated.

The residue was extracted with 1,000 parts of benzene and washed with 1,000 parts of water. The benzene was removed after drying over anhydrous sodium sulfate. The residue was distilled at 140 to 144° C./0.07 mm. Hg to yield 322 parts (82.8%) of slightly yellowish-brown oil.

Refractive index: $N_D^{20}$: 1.5652

2-chlorobenzyl N,N-diethylthiocarbamate is water insoluble, but is soluble in most organic solvents, such as the acetones or alcohols.

When using this compound as a herbicide, the compound can be applied with or without any carrier. A carrier, of course, refers to a medium for transfer of the active ingredient. When a carrier is used, it may be in the form of a solid or liquid. Suitable solid carriers include the various clays, kaoline, talc, diatomaceous earth, silica, vermiculite, calcium carbonate, sawdust, etc. Suitable liquid carriers include solvents or a solution of auxiliary agents for dispersing or solubilizing the active ingredient, e.g., water, benzene, kerosene, alcohol, acetone, methylnaphthalene, cyclohexanone, oils and fats, fatty acids, fatty acid esters and surface active agents.

It is also possible to increase the herbicidal effect by the addition of an agriculture auxiliary agent, such as a nonionic surfactant, e.g., polyoxyethylene alkylarylether, polyoxyethylene sorbitanmonolaurate, etc.; cationic surfactant, e.g., alkyldimethylbenzylammonium chloride, alkylpyridinium chloride; anionic surfactant, e.g., alkylbenzene sulfonate, lignin sulfonate, higher alcohol sulfate, etc.; ampholytic surfactants, e.g., alkyldimethylbetaine, dodecyl aminoethyl glycine, etc.

The percentages shown in these Examples are percentages by weight.

EXAMPLE 2—POWDER

3% by weight of s-(2-chlorobenzyl)-N,N-diethylthiocarbamate and 97% by weight of a mixture of Kaoline and talc were crushed and mixed to yield a powder composition.

EXAMPLE 3—GRANULES s-(2-chlorobenzyl)-N,N-diethylthiocarbamate was dissolved in acetone and the acetone solution was sprayed onto granule type diatomaceous earth while stirring, so as to yield granules containing 3% by weight of the active ingredient. After evaporating the acetone, the composition was granulated and was used by admixing with soil.

EXAMPLE 4—WETTABLE POWDER

20% by weight of s-(2-chlorobenzyl)-N,N-diethylthiocarbamate, 75% of Kaoline and diatomaceous earth and 5% of the wetting agent, sodium alkylbenzene sulfonate, were crushed and mixed. The resulting composition was suspended in water and was used by spray application.

(Experiment 1)

Test Method

An 800 cm.$^2$ pot was filled with up-land soil and a specific number of Goose grass seeds (Eleusine indicia). Other weed seeds were planted at a depth of 0 to 1 cm. and 10 pieces each of corn seeds and cotton seeds were planted at a depth of 0.5 to 1 cm. Specific amounts of a 10% suspension of wettable powder containing the herbicidal ingredient, was diluted with water and was sprayed into the pot.

Following this application, the pot was kept in a greenhouse at an average temperature of 22–28° C. 30 days after the application of the 2-chlorobenzyl N,N-diethylthiocarbamate herbicide and other herbicides, the herbicidal effects were observed.

The herbicidal effect is shown as the following indications:

0—no effect
1—slight inhibition
2—moderate inhibition
3—fair inhibition
4—severe inhibition
5—dead compound of this invention is effective for causing plankton death or for effecting a syncopic state in the plankton. As a result, possible difficulties caused by Blue mussel, Balanus, oysters, or Hydrozoa can be easily prevented.

Unlike the methods used in the prior art for controlling these sea organisms, in particular, the use of chlorine or formalin, the novel compound of this invention demonstrates a remarkably low toxicity to fish and shell-fish, and the residual toxicity after use is sufficiently low to be safe and to permit simple handling.

The Blue mussel shell-fish is grown through young generation such as Trochophora, Loven's larva, Veliger larva. The novel compound of this invention is effective for causing a syncopic state in the Trochophora, Loven's larva, or death. Balanus is grown through young generation such as Nauplius, Siplius, and the compound of this invention is also effective for causing a syncopic state in the Nauplius, Siplius, or in causing death.

Blue mussel is adhered to waterways by the generation of Trochophora. Accordingly, such adhesion can be prevented by causing death at the generation.

The novel compound of this invention has been found to be effective in concentrations of 0.1–0.2 p.p.m. per hour. Accordingly, the adhesion of sea organisms can be prevented by adding the novel compound for one hour once a day.

The novel compound of this invention can be used in the form of an emulsion or solution prepared by admixing various additives therewith, such as a suitable solvent or surface active agent. If desired, this compound can also be used in a form of a paint.

The following is one example of the compound of this invention. The parts shown in the Example are parts by weight. It should be understood that the Examples and Experiments are intended for purposes of illustration only and are not intended to be limiting unless otherwise specified.

EXAMPLE 5

20 parts of 2-chlorobenzyl,N,N-diethylthiocarbamate, 15 parts of surface active agent (Sorpol trademark of Toho Chemical Industrial Kabushiki Kaisha) and 65 parts of xylene were admixed to make an emulsion, which was diluted with water. The types of additives and concentrations are not limited and can be modified over a broad range. The following is the result of tests using this compound for controlling young generations of sea-organisms.

TEST RESULTS IN UP-LAND SOIL

| Herbicides | Amount of herbicides (g./10 a) | Observation of herbicidal effects | | | | | | | Weight inhibition (percent) | | | | | | |
|---|---|---|---|---|---|---|---|---|---|---|---|---|---|---|---|
| | | A | B | C | D | E | F | G | A | B | C | D | E | F | G |
| 2-chlorobenzyl N,N-diethylthiocarbamate | 125 | 0 | 0 | 4 | 4.5 | 4 | 4.5 | 4.5 | 0 | 0 | 75.2 | 88.9 | 75.3 | 82.4 | 89.5 |
| | 250 | 0 | 0 | 4.5 | 4.5 | 4.5 | 5 | 5 | 0 | 0 | 87.2 | 90.2 | 86.2 | 100 | 100 |
| | 500 | 0.5 | 0 | 5 | 5 | 5 | 5 | 5 | 0 | 0 | 100 | 100 | 100 | 100 | 100 |
| 2,4,6-trichlorobenzyl N,N-diethylthiocarbamate | 125 | 0.5 | 0 | 0 | 1 | 0.5 | 3 | 4.5 | 9.6 | 3.4 | 0 | 6.7 | 4.3 | 50.4 | 79.9 |
| | 250 | 1 | 1.5 | 1 | 2 | 1 | 4 | 5 | 11.2 | 18.4 | 13.6 | 25.3 | 8.6 | 71.2 | 100 |
| | 500 | 3 | 3 | 1.5 | 2.5 | 2 | 5 | 5 | 42.5 | 31.3 | 20.5 | 42.5 | 20.3 | 100 | 100 |
| Treflan | 125 | 0.5 | 1 | 1 | 1.5 | 1 | 4.5 | 4.5 | 5.2 | 7.3 | 8.7 | 16.5 | 13.5 | 76.6 | 73.1 |
| | 250 | 1.5 | 2.5 | 2 | 2 | 2.5 | 5 | 5 | 13.6 | 29.6 | 25.4 | 26.7 | 32.7 | 100 | 100 |
| | 500 | 3 | 4 | 3 | 4 | 3 | 5 | 5 | 38.5 | 69.5 | 58.7 | 72.1 | 55.2 | 100 | 100 |
| | | | | | | | | | | | | Grams | | | |
| Non-treatment | | 0 | 0 | 0 | 0 | 0 | 0 | 0 | 8.6 | 17.9 | 2.2 | 2.7 | 2.5 | 3.2 | 4.5 |

Note.—A=Cotton; B=Corn; C=Asiatic dayflower; D=Common purslane; E=Bed straw; F=Chufa; G=Large crabgrass.

This table shows that the herbicidal effects of the 2-chlorobenzyl N,N-diethylthiocarbamate is quite high and significantly superior to the control compositions.

The 2-chlorobenzyl N,N-diethylthiocarbamate of this invention is also quite effective for preventing the adherence of shells and other sea organisms. The novel (Experiment 2)

Each emulsion prepared in accordance with the process of Example 2 was diluted with seawater to a specific concentration. In the diluted solution, young generations of Blue mussel and Balanus were recovered with a plankton net, and were immersed for 1 hour. Their life condition was observed by microscopic inspection. The results of observation are as follows:

| Compound | Concentration (p.p.m.) | Blue Mussel | | | Balanus | | |
|---|---|---|---|---|---|---|---|
| | | Trochophora | Loven's larva | Veliger larva | Nauplius | Siplius | Adult |
| 2-chlorobenzyl N,N-diethylthiocarbamate | 0.5 | + | + | − | + | + | − |
| | 1.0 | ++ | ++ | ± | + | + | − |
| | 2.0 | +++ | ++ | + | ++ | + | − |
| 4-chlorobenzyl N,N-diethylthiocarbamate | 0.5 | + | − | − | − | − | − |
| | 1.0 | + | + | − | ± | − | − |
| | 2.0 | + | + | − | + | ± | − |
| Benzyl N,N-diethylthiocarbamate | 0.5 | − | − | − | − | − | − |
| | 1.0 | − | − | − | − | − | − |
| | 2.0 | + | ± | − | ± | − | − |
| 2-chlorobenzyl N,N-dimethylthiocarbamate | 0.5 | ± | − | − | − | − | − |
| | 1.0 | ± | − | − | − | − | − |
| | 2.0 | + | ± | − | ± | − | − |
| 2-chlorobenzyl N,N-di-i-propyl thiocarbamate | 0.5 | − | − | − | − | − | − |
| | 1.0 | ± | − | − | − | − | − |
| | 2.0 | ± | − | − | ± | − | − |
| Non treatment | | − | − | − | − | − | − |

NOTE.—Death of sea-organisms: +=slight; ++=remarkable; +++=complete.

(Experiment 3)

The following test was made in a sea water cooling apparatus. The cooling sea water waterway was a one pass system with a capacity of 10,000 m.³/hr. over a 3-month winter period. 10 kg. of the composition of Example 3 was injected for 1 hour, once a day. (The concentration of the compound in the seawater is 1 p.p.m.) The number of shell-fish, mainly, Blue mussel, adhering to a slate test plate was measured.

It was observed that the number of shell-fish adhering to the test plate were 19,400 pieces/m.², in the un-treated waterways, but only 200 pieces/m.² in the treated waterways.

(Experiment 4)

Toxicity for Japanese littleneck

The toxicities of 2-chlorobenzyl N,N-diethylthiocarbamate and 4-chlorobenzyl N,N-diethylthiocarbamate were respectively tested by immersing Japanese littleneck in a solution containing the same for 16 hours. The results are as follows:

| | Concentration p.p.m. | Sut shell | Death | Rate of death (percent) |
|---|---|---|---|---|
| 2-chlorobenzyl N,N-diethylthiocarbamate | 25 | 3 | 2 | 40 |
| 4-chlorobenzyl N,N-diethylthiocarbamate | 25 | 5 | 0 | 0 |

Having now fully described the invention, it will be apparent to one of ordinary skill that many changes and modifications can be made by one of ordinary skill in the art, without departing from the spirit or scope of the invention. Accordingly,

What is claimed as new and intended to be covered by Letters Patent is:

1. 2-chlorobenzyl N,N-diethylthiocarbamate.

References Cited

UNITED STATES PATENTS 3,687,653   8/1972   Bollinger et al. ____ 260—455 A

FOREIGN PATENTS 1,140,924   11/1959   Germany _____ 250—455 A
1,943,983   3/1970   Germany _____ 250—455 A
2,019,491   11/1970   Germany _____ 250—455 A

OTHER REFERENCES

Tilles, J.A.S., vol. 81, Feb. 5, 1959.

LEWIS GOTTS, Primary Examiner

D. R. PHILLIPS, Assistant Examiner

U.S. Cl. X.R.

71—100; 424—300